May 3, 1927.
V. Z. CARACRISTI
1,627,075
METHOD OF STEAM ENGINE OPERATION
Filed Sept. 19, 1924   2 Sheets-Sheet 1
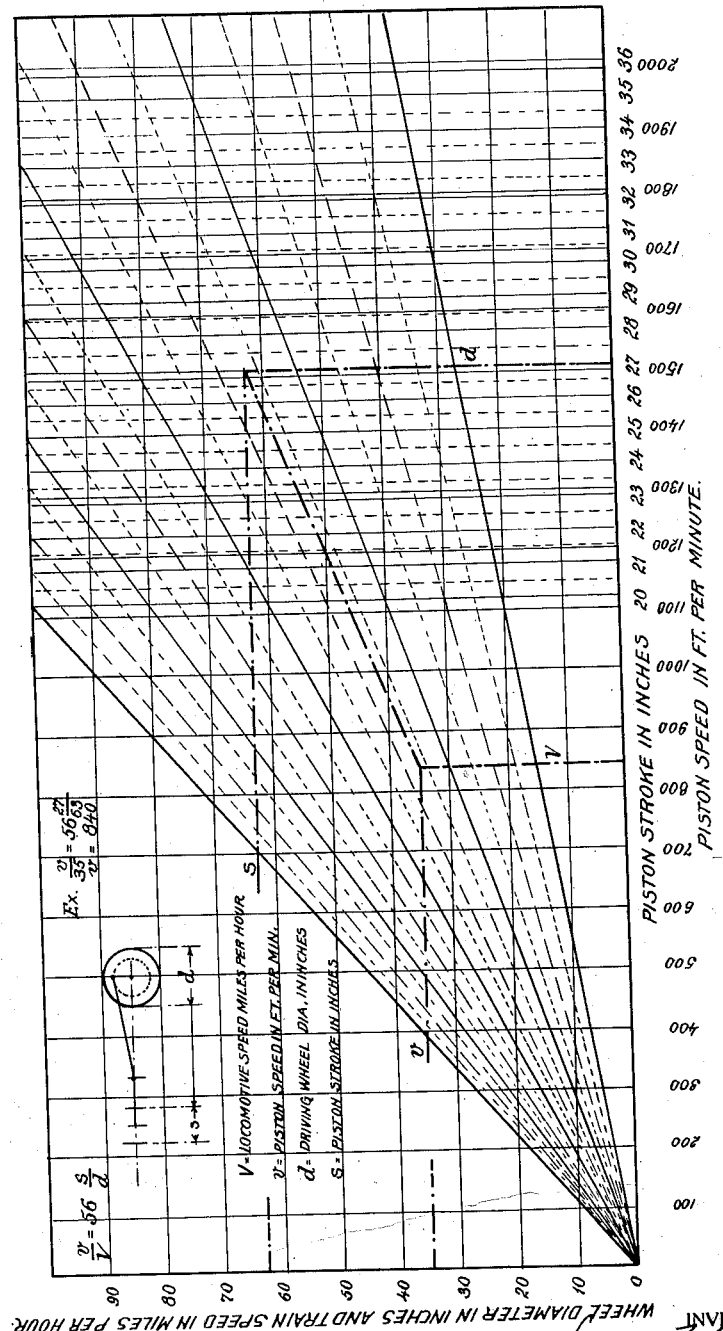

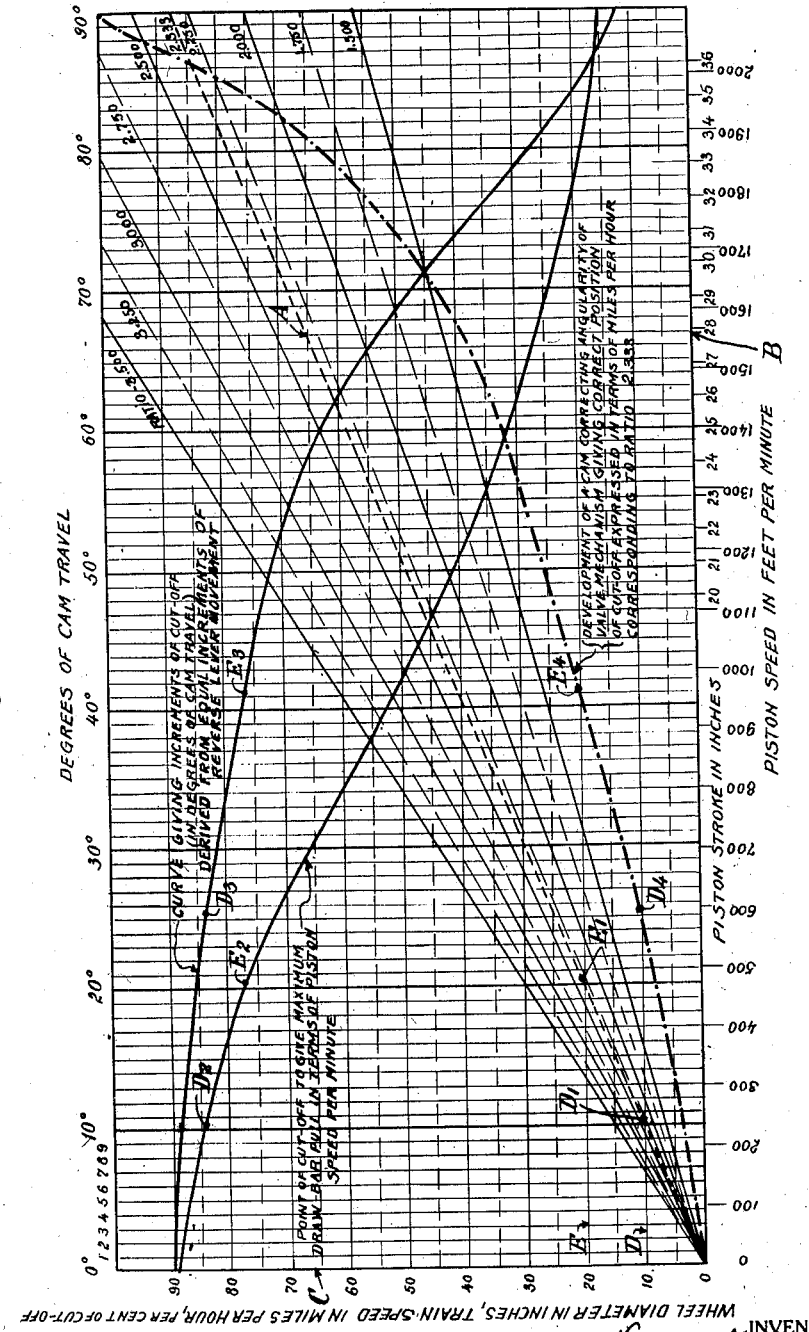

Patented May 3, 1927.

1,627,075

UNITED STATES PATENT OFFICE.

VIRGINIUS Z. CARACRISTI, OF BRONXVILLE, NEW YORK.

METHOD OF STEAM-ENGINE OPERATION.

Application filed September 19, 1924. Serial No. 738,708.

This invention relates to the art of steam engine operation, and has to do more particularly with a method of steam engine operation by which the cutoff of the engine may be controlled so as to produce the maximum work at varying engine speeds. More specifically, the invention comprises a method of indicating the rate of rotation of the engine drive shaft, or, in the case of locomotives, the speed of the locomotive in miles per hour, and similarly indicating, in terms of revolutions per minute or of miles per hour, a result which is produced by the conversion of all the factors governing cutoff, including the values of cutoff required to give maximum work at different speeds, into a single expression. In practicing the method which forms the subject matter of this invention in connection with locomotives, I have found it convenient to make use of a combined valve cutoff and speed indicator of a type in which means is operatively correlated with a speed indicator for the purpose of permitting the position of the cutoff valve to be adjusted in accordance with the piston stroke and speed of the engine, all of these values being expressed in terms of miles per hour, so as to enable the maintenance of a predetermined ratio between piston speed and point of cutoff, such as may be required at any given locomotive speed. A valve cutoff correction instrument of this general character is shown and described in Letters Patent No. 1,398,256, granted to me November 29, 1921, and also in Letters Patent No. 1,419,612, granted to me on June 13, 1922.

In Patent No. 1,398,256 I have illustrated and described a valve cutoff correction instrument which comprises a device for indicating locomotive speed in miles per hour. Associated with the dial of this instrument so as to be read in conjunction therewith, is a second dial on which the position of the valve cutoff is given in percentages of cutoff. Mounted on the speed indicator is a needle which is operatively connected with the reverse lever and this needle is moved to different positions on the second dial by the movements of the reverse lever. The dial which indicates the position of valve cutoff is correlated with the speed dial in such a way that the engineer, by reference to the speed indicator, may quickly ascertain at any instant, the percentage of cutoff for obtaining the maximum draw bar pull at that speed, and by moving the reverse lever until the needle which is connected thereto is opposite the division of the dial which corresponds to the particular speed, he can be certain that the valve cutoff is at the proper value.

In my Patent No. 1,419,612, above referred to, I have shown and described a similar instrument in which the needle which reads on the cutoff dial is connected to the locomotive tumbling shaft and interposed in these connections is a cam arranged to compensate the operation of the needle for differences in the angular movement of the cutoff valve with respect to that of the operating gear.

It is the object of my present invention to provide a method of steam engine operation whereby the operation of the valve cutoff indicator is not only automatically compensated for differences in the angular movement of the cutoff valve with respect to that of the operating gear, as described in Patent No. 1,419,612, but in addition thereto, the reading of the cutoff indicator is so converted as to reduce the variable factors to expressions which are given in terms of miles per hour, whereby the reading of the speed indicator may be used directly in a manner presently to be described, for indicating the proper position of valve cutoff. The invention, therefore, includes a method of designing a cam surface to be used in the actuating means for the valve cutoff indicator and so formed and proportioned as to produce the desired conversion of terms, whereby all of the variable factors are translated into miles per hour of locomotive movement.

Since reference may be readily made to my prior patents, above mentioned, it is not necessary to describe in detail the specific formation and arrangement of the speed and valve cutoff indicating means disclosed in the said patents, or in the arrangement of the actuating means in which this new cam is to be used. As described in those patents, however, it is to be understood that as the speed of the locomotive increases in normal operation, the reverse lever must be moved to different positions of adjustment so that the cutoff will take place at different points in the piston stroke. In the instruments described in those patents, the position of the cutoff valve is indicated on a cutoff scale by the movement of a hand or pointer connected to the reverse lever and intended to be positioned at all times in a relation to that scale which corresponds to the relation of the pointer moving over the correlated speed indicator scale to that scale. This indicating mechanism is conveniently mounted in the locomotive cab where it may be readily observed by the engineer. The speed indicator used is of any conventional form and it is driven in any usual way from a moving part of the locomotive, as, for instance, one of the driving wheels. The hand or pointer of the valve cutoff indicator is operatively connected with the locomotive tumbling shaft so that as the reverse lever is given different positions of adjustment, the position of the valve is indicated by the position of the pointer connected to it, with reference to the cutoff indicator dial. By reason of the correlation of the cutoff indicator dial and the speed indicator dial, the engineer can easily place the reverse lever in that position of adjustment which will result in the cutoff pointer being placed, with reference to its dial, in the same position that the speed indicator pointer bears with reference to the speed dial, and when this relation has been established then the valve cutoff is at the proper value for obtaining a maximum draw bar pull at the particular speed.

As is well known in the art, the position of cutoff, in order to give maximum work or economy, is variable and is proportional to the speed of the piston actuating the locomotive. This piston speed is directly proportional to the speed of the locomotive when expressed in terms of miles per hour. However, equal increments of cutoff do not result in equal increments of tumbling shaft travel, or, in other words, when expressed in terms of tumbling shaft travel, the cutoff is variable. This variation is substantially the same in all forms of valve operating mechanism used in locomotives, and is brought about by differences in angularity of the moving parts of the valve motion.

In order to correlate these several variable factors and to express the result in terms of miles per hour, very elaborate mathematical calculations are necessary, but these are all of a known character. However, it has not been apparent, heretofore, how these variables may be combined so as to be expressed by means of the contour of a cam, and the present invention, therefore, is intended to provide a method of correlating the several factors, such as piston stroke in inches, piston speed in feet per minute, driving wheel diameter in inches, train speed in miles per hour, and expressing their combined effect in such a way as to make it possible to design a cam which may be used in a valve cutoff correction instrument and which will express the position of the valve cutoff in terms of miles per hour.

In the accompanying drawings,

Fig. 1 is a chart showing values of piston stroke in inches, piston speed in feet per minute, wheel diameter in inches, and train speed in miles per hour, and Fig. 2 is a chart showing graphically how the several variable factors may be expressed in the same units and then combined so as to permit of the design of a cam which will express their relationship.

With reference now to Fig. 1, it will be seen that wheel diameter in inches and train speed in miles per hour have been used as ordinates on the chart, and piston speed in feet per minute and piston stroke in inches as abscissæ. Since the ratio of piston speed in feet per minute to locomotive speed in miles per hour, bears a constant relation to the ratio of piston stroke in inches to driving wheel diameter in inches, as shown in the upper left-hand corner of the chart, it will be evident that by drawing a horizontal line through the value corresponding to the wheel diameter in inches of any given locomotive, and a vertical line through the value of piston stroke in inches, these lines will intersect at a point which lies on a line drawn through the origin and expresses the ratio between that wheel diameter and piston stroke. In a similiar manner, if a horizontal line is drawn through any given value in miles per hour, and a vertical line through the piston speed in feet per minute which corresponds to that rate of speed of engine travel, it will be found that the point of intersection of these lines will lie on the line drawn through the origin previously mentioned. This follows because of the constant relation between the ratios of piston stroke to wheel diameter and piston speed to locomotive speed. On the chart there are shown drawn through the origin, numerous lines which show different ratios between piston stroke and wheel diameter and also between piston speed and locomotive speed. Consequently, by referring to this chart, when any three of these factors are known, the fourth may be quickly ascertained.

In Fig. 2 the chart shown in Fig. 1 has been duplicated, and the percentage of cutoff has been expressed in the same terms as wheel diameter in inches, and train speed in miles per hour and degrees of cam travel have been expressed in the same terms as the piston speed in feet per minute. A curve which gives the points of cutoff to obtain maximum draw bar pull, expressed in terms of piston speed per minute, has also been superimposed on the chart, this curve being derived from values obtained as a result of published tests. Another curve which shows equal increments of cutoff expressed in degrees of cam travel corrected to 90° cam travel has also been superimposed on the scale. All constant and variable factors have now been reduced to a common basis, and it is now possible to convert into a cam form the conditions in any particular locomotive having a fixed wheel diameter and piston stroke when these factors are expressed in terms of miles per hour.

The method of arriving at the variable cam shape is given in the following examples:

Referring now to the chart, a line A is first drawn which represents the relationship between piston stroke, as given at B, and wheel diameter as represented at C. In the particular example, the wheel diameter is 65 inches, and the piston stroke 28 inches. At the point where the horizontal and vertical lines drawn from these values intersect, a line is drawn through the origin, and by reference to this line, any particular piston speed in feet per minute may be expressed in terms of train speed in miles per hour, as will be readily understood. Assuming now, that the train speed is 10 miles per hour, as at D, then a line drawn through the point 10 on the train speed scale intersects the broken line through A at $D^1$. Following a line vertically through $D^1$, it will be found that this line intersects the curve of maximum draw bar pull at the point $D^2$. The intersection of the vertical line with the curve shows that the proper cutoff for that particular speed should take place at approximately 84% of the piston stroke. Drawing a horizontal line through the point $D^2$ to its intersection with the curve showing equal increments of cutoff in degrees of cam travel, there results the point $D^3$, which shows, on reference to the scale of degrees in cam travel, that the cam should be moved approximately 26½° to secure the 84% cutoff. Drawing a line vertically through the point $D^3$, we find that it intersects the horizontal line drawn through the point D, at the point $D^4$, and this gives the first point on the cam shape which is to convert and express all the factors in terms of miles per hour.

Having thus obtained the first point on the cam, the second point may be determined in a corresponding manner, taking, for instance, a speed of 20 miles per hour. A line drawn through the value 20 on the train speed scale, intersects the broken line through A at $E^1$. The corresponding point of cutoff for maximum draw bar pull is at $E^2$, and the corresponding point on the curve of equal increments of cutoff given in degrees of cam travel, lies at $E^3$. Drawing a line downwardly through $E^3$, it is found that it intersects the line representing 20 miles per hour at the point $E^4$, and this is the second position on the cam. Following this method throughout the range of speed, a series of points is determined so that by drawing a curve through these several points there results the dot and dash line which has been designated on the chart as the development of a cam.

It can be seen that this cam shape correlates all of the factors in the problem, and expresses them in terms of miles per hour. When such a cam is placed in the instrument and interposed in the connections between the reverse lever and the valve cutoff needle, it will be evident that since the factors involved in determining the correct position of adjustment of the valve cutoff are now expressed in miles per hour, it is only necessary for the engineer to make sure that the two pointers on the speed indicator, namely, the pointer indicating speed and the pointer indicating the position of the reverse lever, are placed in coincidence, when the valve cutoff will have the correct value to secure the maximum draw bar pull at the indicated speed. The use of such a cam, therefore, in this instrument, eliminates the necessity of providing a cutoff indicator scale or dial correlated with the speed dial. Furthermore, the engineer is not obliged to note the position of the reverse lever with respect to the quadrant, but may make the adjustments necessary to give maximum draw bar pull simply by watching the speed indicator and moving the reverse lever so that the two pointers coincide. This type of instrument, therefore, greatly simplifies locomotive operation and the construction of the instrument is also simplified. It will be understood that a cam constructed in accordance with the method outlined will produce the desired conversion throughout the range of speeds and, furthermore, it is not necessary to make any considerable change in the instrument when it is used on locomotives having different ratios of piston stroke to wheel diameter. So long as this ratio remains constant throughout a number of locomotives, the same type of cam may be used in the instrument; that is to say, an instrument having a cam which is correct for use in a locomotive having a piston stroke of 27", and a wheel diameter of 63" will be correct in any other locomotive in which the ratio of piston stroke to wheel diameter is as 27 to 63. If the instrument is to be used in a different locomotive having a different ratio of piston stroke to wheel diameter, a different cam must be employed, but since the insertion of the cam in the connections is a simple matter, and since locomotives now in use fall into a few distinct classes, according to the ratio of piston stroke to wheel diameter, it will be seen that it will be necessary for the railroad merely to keep a supply of a few types of cam in stock and the instrument may be used on any of the locomotives in service by the insertion of the proper cam in the connections.

While there is herein illustrated and described one practical and satisfactory embodiment of the improvements, as applied to locomotive engines, Fig. 1 can be revised so as to convert piston speed in feet per minute into terms of revolutions per minute, and thus the chart and the derivation of the curve indicating the correct position of cut-off, as described in Fig. 2, can as well be applied to stationary and marine, as to vehicle propelling engines. Thus the position of the propulsion medium controlling valve can be correctly correlated with indicating and/or recording instruments of different types, as, for instance, those reading either in revolutions per minute or in miles per hour. The instrument and the method of constructing the cam which is used in that instrument are, therefore, of general application, but it will be apparent to those skilled in the art that the same results can be obtained by the use of alternative devices. It should also be understood that while the instrument including the cam by which the various constant and variable factors have been expressed in terms of miles per hour, has been designated as an indicating instrument, it is possible to construct a similar instrument involving the same principles of operation, in which not only are the instantaneous variations of speed indicated, but a permanent record is made of these variations. Such an instrument, if desired, could also include mechanism by which a continuous permanent record of the position of the cutoff valve would be recorded. Therefore, it should be understood that when the term "indicating" is used in the specification and in the claims, with reference to an instrument of the type referred to, this term is intended to include as well so-called recording instruments.

It should also be understood that since the utility of the method and the instrument are by no means limited to locomotive operation in which the constant and variable factors governing cutoff are converted into corresponding expressions in terms of miles per hour, but may also be converted into expressions corresponding to revolutions per minute, as, for instance, of a drive or propellor shaft, that the scope of the claims is not to be restricted to a conversion of these factors into terms corresponding to miles per hour, but these claims are also intended to include the conversion of the factors into terms corresponding to revolutions per minute, or other similar terms.

I claim:

1. A method of steam engine operation which comprises indicating the values of speed in selected units and simultaneously indicating in terms of the same units, the speed at which each position of the cut-off valve will produce the maximum cylinder result.

2. A method of steam engine operation which comprises indicating the values of speed in selected units, simultaneously indicating in terms of the same units, the speed at which each position of the cut-off valve will produce the maximum cylinder result, and adjusting the cut-off valve so that the indicated values will be the same throughout the range of speeds.

3. The method of locomotive operation which comprises converting the position of cut-off for the production of maximum cylinder result throughout the range of speed of the locomotive into an expression in units which are a function of miles per hour of surface speed of the locomotive, and simultaneously indicating the instantaneous values of speed in miles per hour, whereby the position of cut-off may be corrected to obtain maximum work from the locomotive at any indicated speed.

4. The method of locomotive operation which comprises indicating instantaneous values of surface speed in miles per hour by means of a speed indicator, and transmitting to this indicator an expression, in terms of units of surface speed, which denotes the speed at which the instantaneous position of cut-off will produce maximum work, whereby the two indications may be read in conjunction and the cut-off valve adjusted to the position wherein maximum work will be performed at the indicated speed.

5. The method of locomotive operation which comprises indicating the position of cut-off to produce maximum cylinder result in terms of speed in miles per hour, indicating in correlation thereto the instantaneous values of speed in miles per hour, and adjusting the position of the cut-off valve to cause the first indication to be the equivalent of the second, whereby maximum cylinder result is obtained throughout the range of speeds.

6. A method of locomotive operation which comprises converting all the factors governing cut-off including the values of cut-off required to produce maximum cylinder result at different speeds, into units of locomotive surface speed, reducing the said factors to a single expression in such units, and then adjusting the position of the cut-off valve to vary this expression as the instantaneous values of speed of locomotive travel vary, whereby the cut-off valve will be positioned to provide maximum cylinder result at all times.

7. A method of steam engine operation which consists in converting the adjustment of the propulsion medium controlling valve into an expression in terms which are a function of rate of rotation of the engine drive shaft, simultaneously indicating the rate of rotation of said shaft, and adjusting the position of the valve so that the expression and the indication are the same, whereby maximum cylinder result is obtained throughout the range of speed of the engine.

In testimony whereof I affix my signature.

VIRGINIUS Z. CARACRISTI.